US008229115B2

(12) United States Patent  
Pinder

(10) Patent No.: US 8,229,115 B2  
(45) Date of Patent: Jul. 24, 2012

(54) USE OF COPYRIGHT TEXT IN KEY DERIVATION FUNCTION

(75) Inventor: Howard G. Pinder, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 342 days.

(21) Appl. No.: 12/503,291

(22) Filed: Jul. 15, 2009

(65) Prior Publication Data

US 2011/0013773 A1    Jan. 20, 2011

(51) Int. Cl.
*H04L 9/00* (2006.01)
(52) U.S. Cl. .......... 380/44; 380/45; 380/46; 380/47
(58) Field of Classification Search .......... 380/44, 380/210
See application file for complete search history.

(56) References Cited

U.S. PATENT DOCUMENTS

| | | | | |
|---|---|---|---|---|
| 4,141,005 A | * | 2/1979 | Bonner et al. | 341/60 |
| 4,760,599 A | * | 7/1988 | Okamoto et al. | 713/161 |
| 5,301,231 A | * | 4/1994 | Abraham et al. | 713/191 |
| 5,557,678 A | * | 9/1996 | Ganesan | 380/282 |
| 6,766,305 B1 | * | 7/2004 | Fucarile et al. | 705/51 |
| 7,151,832 B1 | * | 12/2006 | Fetkovich et al. | 380/210 |
| 2002/0037081 A1 | * | 3/2002 | Rogoff et al. | 380/278 |
| 2005/0213759 A1 | * | 9/2005 | Tsuchida | 380/210 |
| 2006/0126827 A1 | * | 6/2006 | Milleville | 380/28 |
| 2008/0019517 A1 | * | 1/2008 | Munguia et al. | 380/210 |

OTHER PUBLICATIONS

U.S. Appl. No. 12/407,884, filed Mar. 20, 2009, entitled "Partially Reversible Key Obfuscation", Inventor: Pinder.

* cited by examiner

*Primary Examiner* — Longbit Chai  
(74) *Attorney, Agent, or Firm* — Merchant & Gould

(57) ABSTRACT

Consistent with embodiments of the present invention, systems and methods are disclosed for deriving a secure key. In some embodiments, a method for deriving a key may be provided comprising: generating a first input value; loading a first register with the first input value; generating a second input value; loading a second register with the second input value; updating the first register and the second register at the same time, where the step of updating comprises: applying a first update function to the current value of the second register to determine a third input value; applying an XOR function to the third input value and a fixed string to determine a fourth input value, wherein the fixed string contains a legal notice; incrementing an offset to the fixed string; storing the fourth input value in the first register; applying a second update function to the current values of the first register and the second register to determine a fifth input value; storing the fifth input value in the second register; repeating the step of updating the first register and the second register a predetermined number of times; and outputting the value of the second register as the key.

20 Claims, 4 Drawing Sheets

USE OF COPYRIGHT TEXT IN KEY DERIVATION FUNCTION

FIELD OF THE DISCLOSURE

The present disclosure relates to the derivation of keys through the use of copyright text, such that an unauthorized decryptor may be notified of the key owner's legal rights.

BACKGROUND

It may be desirable to employ a key derivation function employing legal notice language in a key distribution system. One advantage may be that pirate devices that employ the key derivation function will have clear notice of the key owner's legal rights.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure.

DESCRIPTION OF EXAMPLE EMBODIMENTS

Overview

Figure 1:
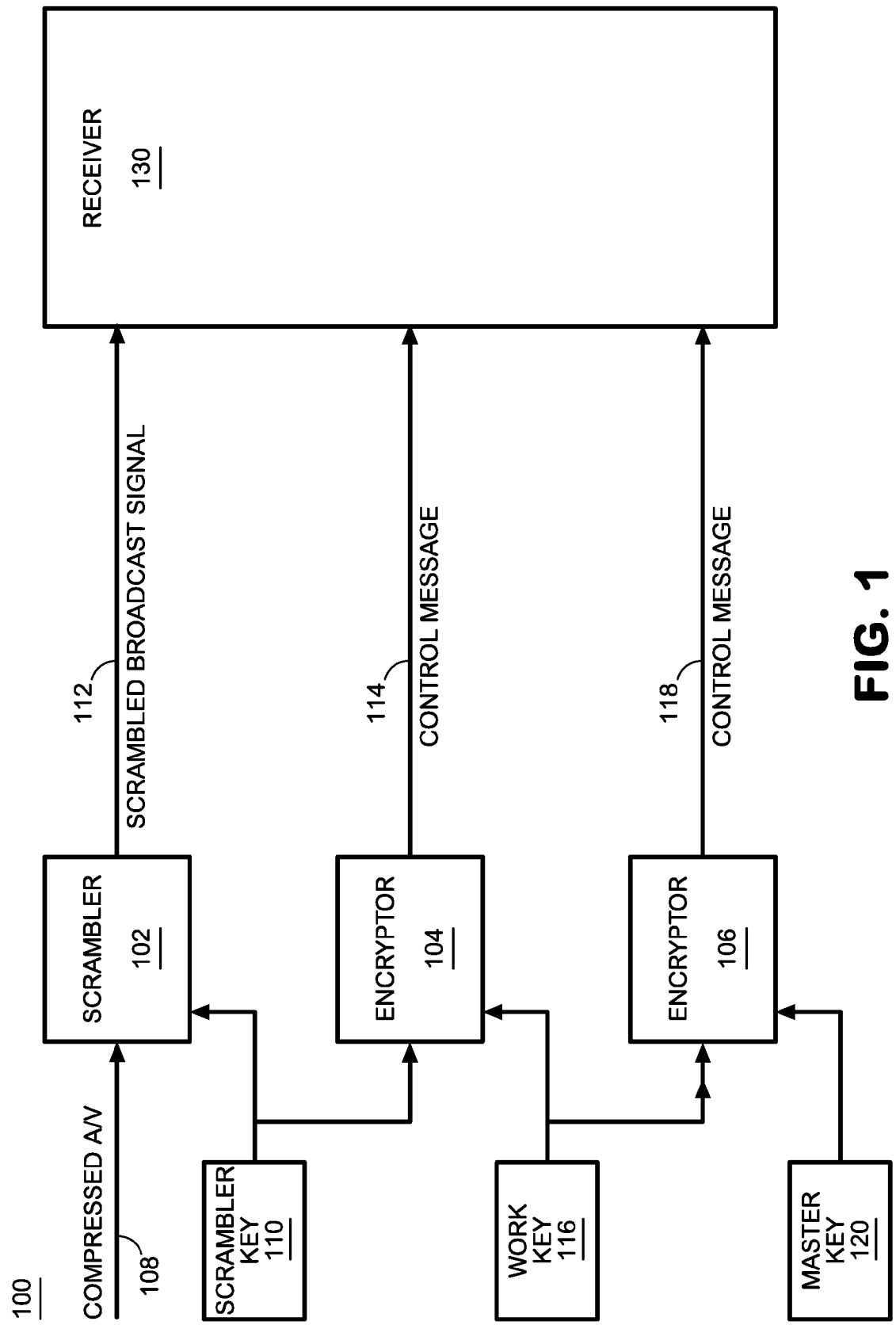
FIG. 1 is a block diagram of an operating environment.

Consistent with embodiments of the present invention, systems and methods are disclosed for deriving a secure key. In some embodiments, a method for deriving a key may be provided comprising: generating a first input value; loading a first register with the first input value; generating a second input value; loading a second register with the second input value; updating the first register and the second register at the same time, where the step of updating comprises: applying a first update function to the current value of the second register to determine a third input value; applying an XOR function to the third input value and a fixed string to determine a fourth input value, wherein the fixed string contains a legal notice; incrementing an offset to the fixed string; storing the fourth input value in the first register; applying a second update function to the current values of the first register and the second register to determine a fifth input value; storing the fifth input value in the second register; repeating the step of updating the first register and the second register a predetermined number of times; and outputting the value of the second register as the key.

In some embodiments, a system may be provided comprising: a first value generator connected to a first register; a second value generator connected to a second register; a function defining generator capable of defining and executing one or more update functions; a user definable fixed string containing a legal notice; and a processor programmed to perform the steps of: generate a first value with the first value generator; generate a second value with the second value generator; store the first value in the first register; store the second value in the second register; increment the offset of the fixed string; executing one or more update functions on the values stored in the first and second registers such that the fixed string, the first value, and the second value are incorporated into an encryption key.

Both the foregoing general description and the following detailed description are examples and explanatory only, and should not be considered to restrict the invention's scope, as described and claimed. Further, features and/or variations may be provided in addition to those set for the herein. For example, embodiments of the invention may be directed to various feature combinations and sub-combinations described in the detailed description.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Detailed Description

A key ladder may be used to derive a key from a given set of inputs. As part of the key ladder process, a string of values may be employed. The string of values may be set as to include a legal notice such as "Copyright 2009, CISCO SYSTEMS. INC™, All Rights Reserved". Thus, an attacker who must perform the same key ladder mechanism may be made aware of the legal restrictions against unauthorized use.

FIG. 1 illustrates an environment in which embodiments of the invention may be located. A conditional access system 100 may include a scrambler 102 and encryptors 104 and 106. A compressed digital audio/video signal 108 may be scrambled by the scrambler 102, utilizing a scrambling key 110, to obtain a scrambled broadcast signal 112.

During signal scrambling, scrambling key 110 may determine a scrambling transformation. Scrambling key 110 may be changed at fixed intervals of time, such as every few seconds, to maintain a secure system. In some embodiments, scrambling key 110 may be continuously transmitted to the subscriber's receiver 130. In some embodiments, receiver 130 may be a set-top box. System 100 may encrypt scrambling key 110 with encryptor 104 and transmit it within a control message 114. Control message 114 may also contain information such as program attributes and subscriber information.

To prevent control message 114, which may include scrambling key 110, from being understood by an unauthorized attacker, control message 114 may be encrypted by encryptor 104 before transmission, by utilizing a work key 116. Work key 116 may be updated periodically. Work key 116 may be sent to receiver 130 through a control message 118.

In some embodiments, control message 118 may be transmitted to receiver 130 over the Internet, telephone lines, a signaling network, or by the use of a portable memory. Prior to transmission, control message 118 may be encrypted by a master key 120. Master key 120 may be unique to each receiver 130 on a given network. Scrambling key 110 may be protected by work key 116, which may in turn be protected by master key 120. This key protection "chain" may be referred to as a key ladder.

The same key ladder may be utilized in order to decrypt the necessary secure keys and scrambled broadcast audio/video signals 112 at receiver 130. Master key 120 may be used with a decryptor associated with receiver 130 to decrypt control message 114 and work key 116. Decrypted work key 116 may then be utilized by the decryptor associated with receiver 130 to decrypt control message 114 and scrambling key 110. Decrypted scrambling key 110 may then be utilized by a descrambler associated with receiver 130 to descramble scrambled broadcast signal 112 and output the compressed audio/video.

Figure 3:
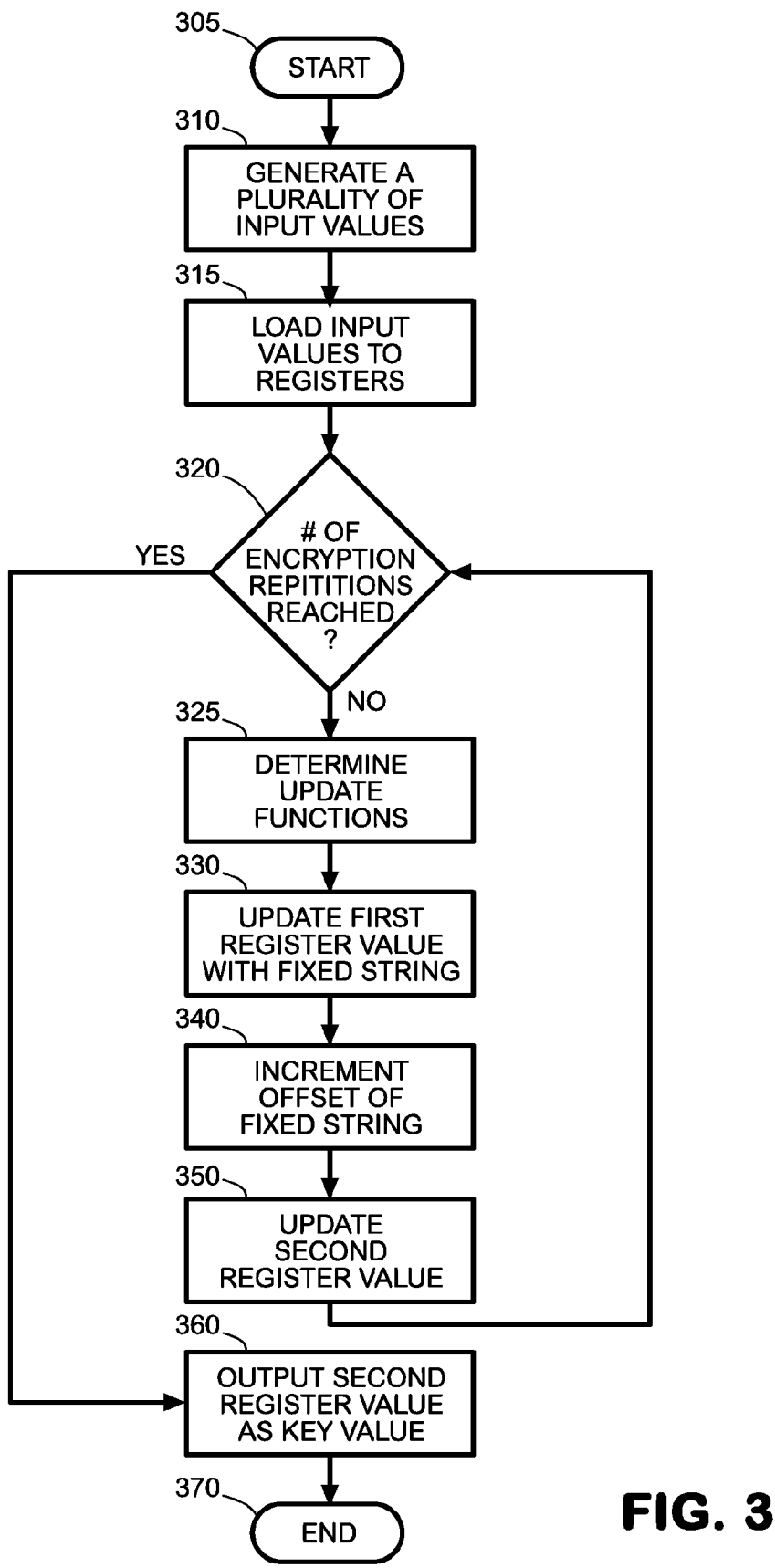
FIG. 3 is a flow chart illustrating operation of embodiments of the invention.
Figure 4:
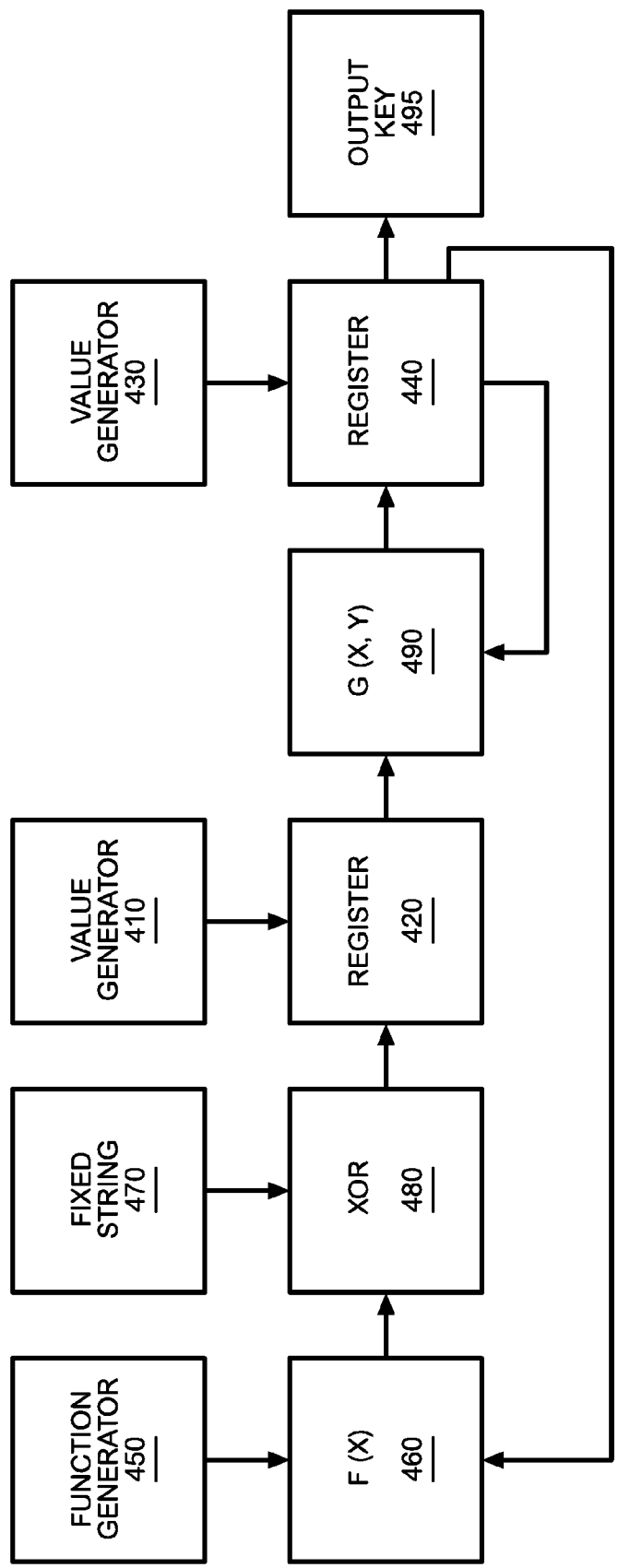
FIG. 4 is a state machine illustrating operation of embodiments of the invention.

In some embodiments, any or all of scrambling key 110, work key 116, and master key 120 may be derived in the manner described in FIGS. 3 and 4 such that a fixed string containing a legal notice is employed. When the keys are derived, the legal notice may become readable by the device and put the user on notice of the key owner's legal rights.

Figure 2:
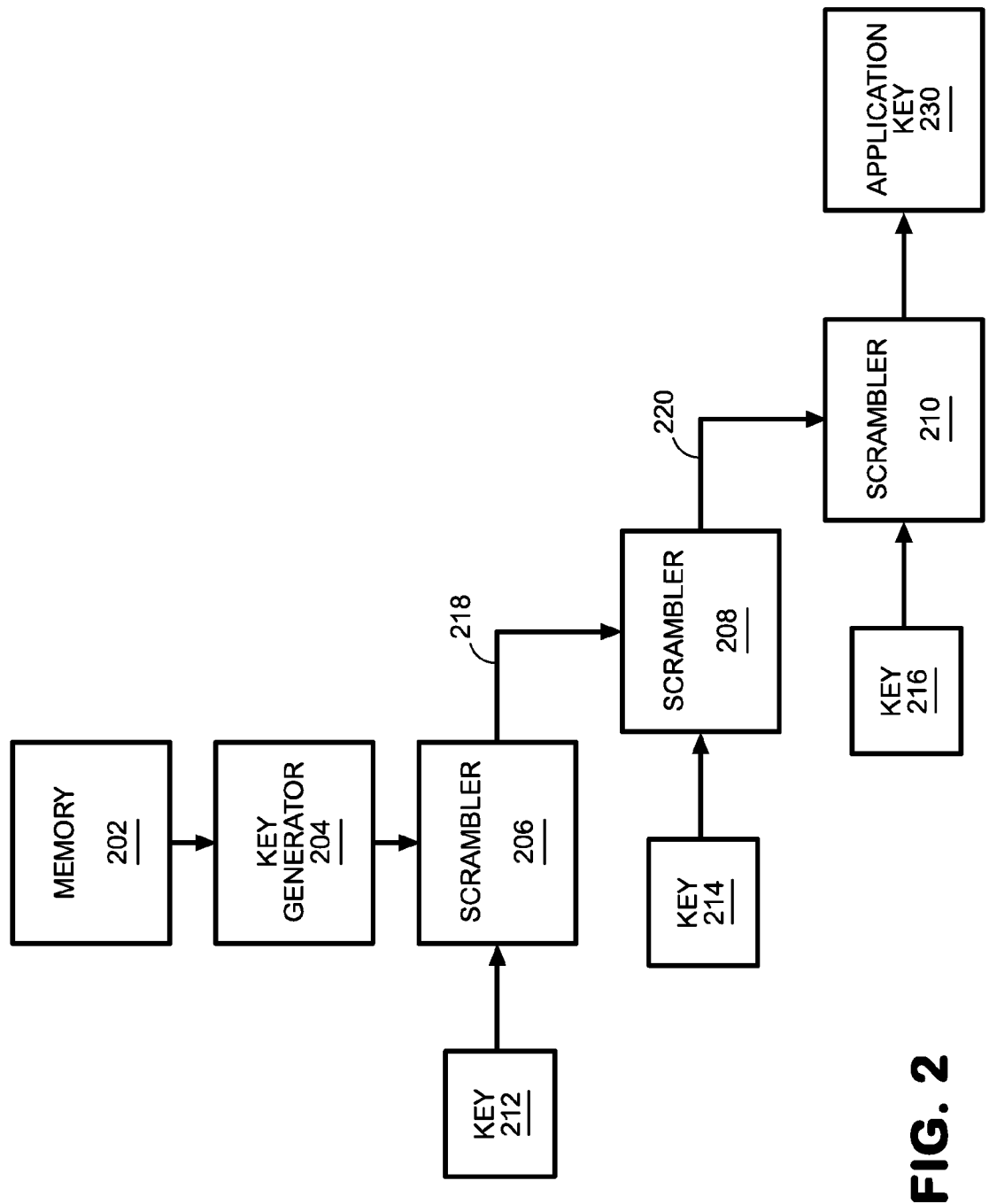
FIG. 2 is a block diagram showing operating embodiments of the invention.

FIG. 2 is a block diagram illustrating secure key unwrapping in an embodiment of a key ladder system. The key ladder system 200 may comprise a memory 202, a key generator 204 and decrypters 206, 208, and 210. Each of the decrypters 206, 208, and 210 may utilize an cryptographic algorithm, for example a Data Encryption Standard (DES), a 3DES, or an Advanced Encryption Standard (AES) type of algorithm, in order to decrypt encrypted key input. Memory 202 may be adapted to store a root key, for example a key such as master key 120. The root key stored in memory 202 may be further protected by key generator 204.

Key generator 204 may comprise suitable logic, circuitry and/or code that may be adapted to obfuscate, or otherwise further enhance the security of the root key stored in memory 202.

Application keys, for example, application key 220 may be decrypted by utilizing several encrypted keys, for example, encrypted key 212, encrypted key 214, and encrypted key 216. Once the root key stored in memory 202 is processed by key generator 204, decrypter 206 may employ the processed root key to decrypt encrypted key 212, and obtain decrypted key 218. Decrypted key 218 may comprise, for example, a work key. Decrypted key 218 may be employed by decrypter 208 in order to decrypt encrypted key 214 and obtain decrypted key 220. Decrypted key 220 may comprise, for example, a decryption key.

Decrypted key 220 may be employed by decryptor 210 in order to decrypt encrypted key 216 and obtain decrypted application key 220. The key ladder may be adapted to have varying levels of protection by increasing the number of the encrypted keys and the corresponding decrypters, and by utilizing each previously decrypted application key in a subsequent decryption of a following encrypted key. The key ladder may be utilized to "unwrap" a master key, a work key and a decryption key. The master key, work key and decryption key may then be utilized to decrypt one or more application keys 220.

Even though this approach may provide increasing levels of protection by increasing the number of scramblers and encrypted keys, it still may be possible for an unauthorized attacker to obtain decrypted keys through nefarious means. In some embodiments, application keys 220 may be derived in the manner described in FIGS. 3 and 4 such that a fixed string containing a legal notice is employed. When the keys are derived, the legal notice may become readable by the device and put the user on notice of the key owner's legal rights.

FIG. 3 illustrates the operation of some embodiments of the invention. The method may start at step 305 when it may be desired to derive a secure key. The method may proceed to step 310 where a plurality of input values may be generated. These input values may be generated by one or more value generators. In some embodiments, the value generators may be programmed to generate random number or string values from a seed value, such as a current system clock value. In some embodiments, the input values may be generated in response to user input.

Once a plurality of input values may be generated, the method may proceed to step 315, where the input values are loaded into the registers associated with a key derivation system. The registers may be capable of receiving input values and transmitting the values stored in the registers. In some embodiments, the registers may be defined locations in a memory associated with a key derivation system.

After the plurality of input values may be loaded to the registers, the method may proceed to step 320. At step 320 a determination may be made as to the number of repetitions of the encryption process described in steps 325-350 have occurred. In some embodiments, it may be pre-determined what number of encryption repetitions are desired. Increased repetitions of encryption may lead to a more secure encryption. If it may be determined that the number of encryption repetitions has occurred, the method may proceed to step 360.

If at step 320, it may be determined that the desired number of encryption repetitions has not been reached, the method may proceed to step 325. At step 325, update functions may be determined which are capable of being applied to the current values of the plurality of registers. In some embodiments, the update functions may be defined by a function generator, where the function generator determines an appropriate function to alter one or more input values into an output value according to the rules of the update function. In some embodiments, the update functions may be user-defined.

After the update functions have been defined, the method may proceed to step 330. At step 330, a first register value may be updated with a determined update function in conjunction with a fixed string. In some embodiments, the fixed string may contain a human-readable legal notice. The legal notice may include a copyright notice sufficient to put an individual viewing the step 330 operation and resultant decrypted key on notice of the key owner's legal rights. Once the first register value is updated and stored in the first register, the method may proceed to step 340.

At step 340, the offset of the fixed string may be offset by a pre-determined number of bytes, for example four bytes. It should be understood that in some embodiments, the offset may be any value determined by a user. Once the offset of the fixed string is incremented, the method may proceed to step 350.

At step 350, a second register value may be updated. In some embodiments, the second register value may be update through an update function generated in step 325. In some embodiments, steps 330 and 350 occur simultaneously. In some embodiments, the second register value may be updated using the current second register value and the updated first register value. Once the second register value may be updated and stored in the second register, the method may proceed to step 320.

If at step 320, it is determined that the pre-determined number of encryption repetitions has been reached, the method may proceed to step 360. At step 360, the value stored in the second register may be output as a secure key value. In some embodiments, the resultant secure key may be used to secure a communication to be sent across a network, such as the Internet. The method may then conclude at step 370.

FIG. 4 is a state diagram illustrating embodiments of the present invention. The illustrated state machine may employ a register 420 and a register 440 capable of storing input values and transmitting stored values. When the state machine may be initialized, register 420 may store a value input from a value generator 410. Value generator 410 may generate any value appropriate for use in key generation, such as numbers or strings.

Similarly, a value generator 430 may generate a value to initialize register 440. In some embodiments, value generators 410 and 430 may be a single generator device. The state machine may be stepped by simultaneously updating the current values of register 420 and register 440. In some embodiments, register 420 may be updated by first applying function F(x) 460, where x is the current value of register 440. F(x) 460 may be generated by function generator 450. Function generator may define any appropriate function capable of adding a step of encryption to one or more input values.

The result of F(x) 460 may subsequently be applied to an XOR function 480 in conjunction with a fixed string 470. Fixed string 470 may consist of a string containing a legal notice such as "Copyright CISCO SYSTEMS, INC.™, All Rights Reserved". Such a legal notice may serve to put an unauthorized attacker of the resultant output key 490 on notice of output key's 490 owner's legal rights.

After XOR function 480 is applied, fixed string 470 may be offset by a pre-determined number of bytes. The offset may operate to wrap from the end of fixed string 470 to the beginning of fixed string 470 as necessary.

The value of register 440 may be updated by employing function G(x,y) 490, where x may be the current value of register 420 and y may be the current value of register 440. G(x,y) 490 may be any function capable of adding further encryption to its input values. In some embodiments, G(x,y) 490 may be pre-defined by a user. The output of G(x,y) 490 may be subsequently stored in register 440.

The state machine may be stepped a pre-determined number of times to increase the level of encryption. Once the state machine has been stepped the desired number of times, the current value stored in register 440 may be output as output key 495.

The methods and systems described may be embodied in any computer-readable medium for use by or in connection with an instruction execution system, apparatus, or device. Such instruction execution systems may include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

Any software components illustrated herein are abstractions chosen to illustrate how functionality may partitioned among components in some embodiments disclosed herein. Other divisions of functionality may also be possible, and these other possibilities may be intended to be within the scope of this disclosure. Furthermore, to the extent that software components may be described in terms of specific data structures (e.g., arrays, lists, flags, pointers, collections, etc.), other data structures providing similar functionality can be used instead.

Any software components included herein are described in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Any software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

Any software components illustrated herein are abstractions chosen to illustrate how functionality may partitioned among components in some embodiments disclosed herein. Other divisions of functionality may also be possible, and these other possibilities may be intended to be within the scope of this disclosure. Furthermore, to the extent that software components may be described in terms of specific data structures (e.g., arrays, lists, flags, pointers, collections, etc.), other data structures providing similar functionality can be used instead.

The flow charts, messaging diagrams, state diagrams, and/or data flow diagrams herein provide examples of some embodiments of the present invention. Alternatively, these diagrams may be viewed as depicting actions of an example of a method implemented by some embodiments of the invention. Blocks in these diagrams represent procedures, functions, modules, or portions of code which include one or more executable instructions for implementing logical functions or steps in the process. Alternate implementations may also be included within the scope of the disclosure. In these alternate implementations, functions may be executed out of order from that shown or discussed, including substantially concurrently or in reverse order, depending on the functionality involved. The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method for deriving a key comprising:
generating a first input value;
loading a first register with the first input value;
generating a second input value;

loading a second register with the second input value different from the first input value;
updating the first register and the second register at a same time, where the step of updating comprises:
applying a first update function to a current value of the second register to determine a third input value;
applying an XOR function to the third input value and a fixed string to determine a fourth input value, wherein the fixed string contains a legal notice;
incrementing an offset to the fixed string with a predetermined number of bytes after said XOR function is applied;
storing the fourth input value in the first register;
applying a second update function to the current values of the first register and the second register to determine a fifth input value;
storing the fifth input value in the second register;
repeating the step of updating the first register and the second register a predetermined number of times; and
outputting the value of the second register as the key.

2. The method of claim 1, further comprising storing the key on a set-top box.

3. The method of claim 2, further comprising decrypting digital transmissions with the key and displaying the digital transmissions.

4. The method of claim 1, wherein the offset is incremented in 4-byte intervals.

5. The method of claim 1, wherein the first update function is defined by a user.

6. The method of claim 1, wherein the key is employed in securing a digital transmission.

7. The method of claim 6, wherein the key is employed to decrypt the digital transmission and display the transmission in an analog format.

8. The method of claim 1, wherein the key is used in a key ladder.

9. A system comprising:
a first value generator connected to a first register;
a second value generator connected to a second register;
a function defining a generator capable of defining and executing one or more update functions;
a user definable fixed string containing a legal notice; and
a processor programmed to perform the steps of:
generate a first value with the first value generator;
generate a second value, different from the first value with the second value generator;
store the first value in the first register;
store the second value in the second register;
updating the first register and the second register at a same time, where the step of updating comprises:
applying a first update function to a current value of the second register to determine a third input value;
applying an XOR function to the third input value and the fixed string to determine a fourth input value;
increment an offset of the fixed string with a predetermined number of bytes after said XOR function is applied;
storing the fourth input value in the first register;
applying a second update function to the current values of the first register and the second register to determine a fifth input value;
storing the fifth input value in the second register;
execute the update functions on the values stored in the first and second registers such that the fixed string, the first value, and the second value are incorporated into an encryption key after repeating the step of updating the first register and the second register a predetermined number of times.

10. The system of claim 9, further comprising an encryption device capable of employing the encryption key to encrypt digital communications.

11. The system of claim 10, further comprising:
a plurality of set-top boxes each requiring a unique encryption key, wherein the plurality of set-top boxes are each in communication with the processor.

12. The system of claim 11, wherein each of the plurality of set-top boxes has the encryption key stored in memory.

13. The system of claim 11, wherein each of the plurality of set-top boxes accesses the encryption key from a remote location.

14. The system of claim 11, wherein one or more of the plurality of set-top boxes employ the encryption key to decrypt digital transmissions and display the digital transmissions in an analog format.

15. A non-transitory computer-readable medium which stores a set of instructions which when executed performs a method for creating a secure key, the method executed by the set of instructions comprising:
generating a first input value;
loading a first register with the first input value;
generating a second input value;
loading a second register with the second input value different from the first input value;
updating the first register and the second register at a same time, where the step of updating comprises:
applying a first update function to a current value of the second register to determine a third input value;
applying an XOR function to the third input value and a fixed string to determine a fourth input value, wherein the fixed string contains a legal notice;
incrementing an offset to the fixed string with a predetermined number of bytes after said XOR function is applied;
storing the fourth input value in the first register;
applying a second update function to the current values of the first register and the second register to determine a fifth input value;
storing the fifth input value in the second register;
repeating the step of updating the first register and the second register a predetermined number of times; and
outputting the value of the second register as the key.

16. The non-transitory computer readable-medium of claim 15, further comprising:
encrypting a communication with the secure key; and
transmitting the communication over a network.

17. The non-transitory computer readable-medium of claim 16, further comprising:
associating the secure key with a unique device on the network.

18. The non-transitory computer readable-medium of claim 15, further comprising:
storing the secure key on a secured microchip.

19. The non-transitory computer readable-medium of claim 18, wherein the secured microchip is associated with a set-top box.

20. The non-transitory computer readable-medium of claim 19, further comprising:
decrypting secure audio/video communications received at the set-top box.

* * * * *